United States Patent [19]

Rimkus

[11] 4,285,021

[45] Aug. 18, 1981

[54] CIRCUIT FOR GENERATING AN AUDIBLE SIGNAL IN TAPE RECORDERS AT THE TAPE END

[75] Inventor: Hans-Georg Rimkus, Nuremberg, Fed. Rep. of Germany

[73] Assignee: Grundig E.M.V. Elektro-Mechanische Versuchsanstalt Max Grundig, Fed. Rep. of Germany

[21] Appl. No.: 14,741

[22] Filed: Feb. 23, 1979

[30] Foreign Application Priority Data

Mar. 8, 1978 [DE] Fed. Rep. of Germany ....... 2809978

[51] Int. Cl.³ ............................................. G11B 15/06
[52] U.S. Cl. ................................... 360/137; 360/74.1; 360/74.7; 360/67
[58] Field of Search ...................... 360/137, 74.1–74.7, 360/67

[56] References Cited

U.S. PATENT DOCUMENTS

| 3,497,635 | 2/1970 | Schneider | 360/74.7 |
| 4,148,081 | 4/1979 | Satoh | 360/74.1 X |
| 4,157,575 | 6/1979 | Satoh et al. | 360/74.1 |

Primary Examiner—John H. Wolff
Attorney, Agent, or Firm—Gerald Levy

[57] ABSTRACT

A circuit for generating an audible signal in a tape recorder as the tape approaches its end. The circuit includes an open loop extending between the recording amplifier and loudspeaker. The loop is closed by the metallic foil at the end of the tape when the foil bridges a pair of contacts. In the case where an exterior microphone is used with the recorder the speaker signal is electrically fed back to the amplifier.

2 Claims, 2 Drawing Figures

CIRCUIT FOR GENERATING AN AUDIBLE SIGNAL IN TAPE RECORDERS AT THE TAPE END

BACKGROUND OF THE INVENTION

The present invention relates to tape recorders and in particular to a method and apparatus for use in tape recorders to generate an audible warning sound as the tape end is approached during recording.

When recording, it is highly desirable to be able to automatically determine when the end of the tape is being approached and only a small supply or no supply of useable tape is available for continued recording. Such a warning could serve to prevent the loss of date or information.

Heretofore, several systems have been developed for generating such an end of the tape signal. In one type of prior art arrangement, mechanical or electrical counters are used to determine the amount of tape used and hence the amount of remaining tape. It has also been suggested to provide special markers on the tape, for example, a light reflecting or light transparent section, which causes light to intrude upon a photo detector cell when the specially treated tape portion passes a light source. In still another arrangement an audible signal is generated as the tape end is approached by means of a separate signal generator which is switched on by means of a foil coated section at the end of the tape. The foil coated section bridges a set of contacts to activate the signal generator which is used in conjunction with the recorder loudspeaker.

The principal disadvantage of the prior art methods and devices are that they require additional components and hence add to the expense of the recorder. In addition, the additional components take up space. This poses a special problem with regard to hand held dictating devices and particularly miniature tape recorders. In such miniature tape recorders it is not readily possible to install the additional means required of the prior art devices such as counters, distance meters, photo detectors, signal generators and the like because of the very limited space restrictions. In addition, it is important to attract the attention of the person operating the dictating device as the end of the tape approaches and such operator cannot always observe a mechanical or optical warning such as the running of a cassette. It is far more desirable to provide an audible warning.

In view of the above, it is the principal object of the present invention to provide a simple means of generating an audible signal as the end of the tape is approached in a tape recording device.

A further object is to provide such a device that utilizes the existing components of the recording machine and does not add to the size or bulk of the machine.

A still further object is to provide such a tape end warning device which operates audibly and does not require that the operator watch a meter or other visual warning indicator.

SUMMARY OF THE INVENTION

The above and other beneficial objects and advantages are attained in accordance with the present invention by providing an improved end of the tape warning indicator for a tape recorder which relies on the fact that tapes are commonly provided at their end portions with a metalic foil section, which serves to indicate the end of the tape. The recorder includes a microphone (or microphone contact), for an external microphone an amplifier connected to the output of the microphone and a loudspeaker. In accordance with the invention a loop connecting the output of the amplifier to the loudspeaker is provided. The loop is opened by a pair of contacts which are disposed in the path of the tape whereby the loop is closed when the indicating means on the tape spans the contacts.

In the case where the recorder is designed for use with an external microphone, an additional loop is provided between the loudspeaker and the amplifier input. The loop includes a resistor or an R-C network or R-C filter depending upon phase relationship of the signal at the amplifier output with regard to the input signal.

DETAILED DESCRIPTION OF THE PREFERRED EMBODIMENTS

Figure 1:
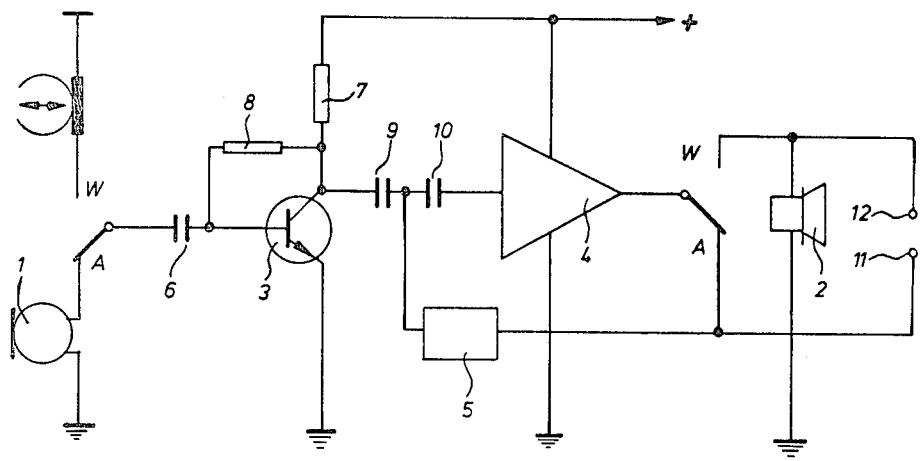
FIG. 1 is a schematic drawing of the end of tape warning circuit of the present invention for use in a recorder in which the microphone and speaker are both contained within a common housing such as a miniature dictating machine.

The basic circuit of the present invention is shown in FIG. 1 which is representative for hand held dictating devices or other recorders which have a built in microphone 1, a loudspeaker 2 a preamplifier 3, a recording amplifier 4, and an automatic recorder limiting circuit 5. During recording, (i.e. with the switch in the "A" position as shown), the low frequency voltage delivered by microphone 1 is fed through capacitor 6 to the first amplifier stage of transistor 3. The feeding of this stage is carried out through resistors 7 and 8. The low frequency voltage is then fed through capacitors 9 and 10 to a main recording amplifier 4 which is depicted in the form of an integrated circuit and which has a high amplification capability. In order to prevent the tape from being subjected to an unduly high signal level, an automatic limiting circuit 5 is built into the recorder and limits the voltage between the preamplifier 3 and the main amplifier 4 to the required value for maximum tape modulation. The limiting circuit 5 is triggered by the output signal of the main amplifier 4 and its output is coupled between capacitors 9 and 10 as shown.

In accordance with the invention, the tape end signal is generated by the loudspeaker 2 (with the recorder in the recording mode (A) by connecting the loudspeaker to the output of the recording amplifier 4 by means of a loop which includes tape end contacts 11 and 12. The tape end contacts 11 and 12 are in the path of the magnet tape. When the tape end contacts 11 and 12 are bridged by the stop foil at the tape end, the output signal of the recording amplifier is fed to the loudspeaker and an audible output sound signal is generated. Since the microphone 1 and the loudspeaker 2 are contained within the same chamber, the output sound signal of the loudspeaker is audibly fed back to the microphone. The output sound signal results in a greater sound level at the amplifier output which is excited to oscillate at a frequency at which the phase condition $\beta$ ges. $= 0°$ for the total system is correct.

In order that no harsh, annoyingly loud sound is generated, the level of the audibly fed back output sound signal of the loud speaker 2 is limited by the automatic recording limiting circuit 5 which is associated with the recording amplifier 4.

It is to be noted that for the feed back, the phase of the amplifier input with respect to its output must not satisfy the phase condition ∅ ges.=0°, since in the audible path between the loudspeaker 2 and the microphone 1 a sound frequency is generated the phase rotation of which has such a value that the total required phase relationship ∅ total=0° is again restored. The prerequisite for the satisfactory operation of the end signal circuit of FIG. 1 is the fixed spatial relationship between the microphone 1 and the loudspeaker 2 within the recorder. This is automatically attained where the microphone and speaker are built into the recorder.

Figure 2:
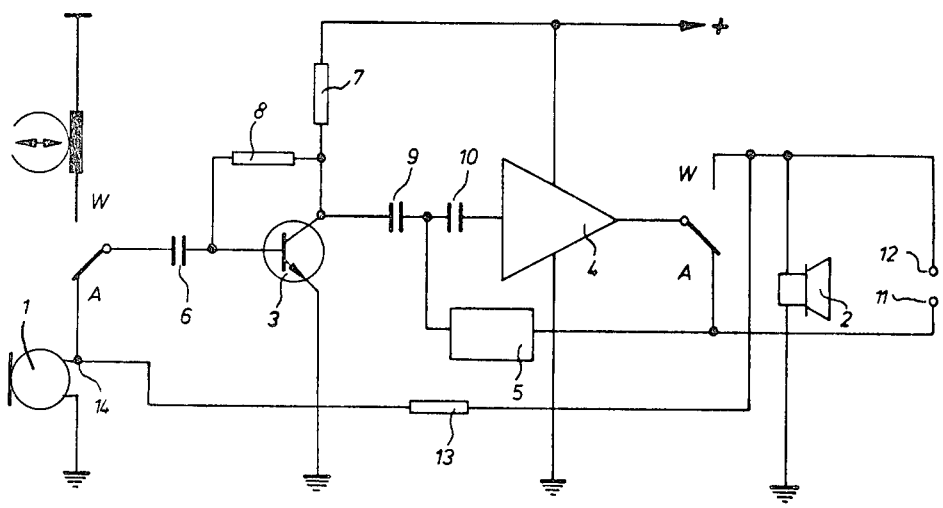
FIG. 2 is a circuit, similar to FIG. 1 modified for the case wherein the recorder is designed for use with an external microphone.

The circuit in FIG. 2 is identical with that of FIG. 1 except as described below. The FIG. 2 circuit may be operated with an external microphone 1 which can be connected, for example, to the connector 14 of the recorder. In this case, there is no fixed spatial relationships between the microphone 1 and the loudspeaker 2, and accordingly it might not be possible to audibly feed back the generated output sound signal of the loudspeaker to the microphone in the manner described above when the end of the tape is reached. In order to assure the desired tape end signal sound in the case of a recorder with an external microphone, the circuit of FIG. 2 is provided, wherein the recording amplifier itself is excited of oscillate. This is done by providing a circuit element 13 connected between the loudspeaker 2 and microphone connection 14. The circuit element 13 may be a resistor, R-C network or R-C filter determined by the amplifier. In an in-phase feed back arrangement through a resistor, the feed back condition of the amplifier must be satisfied with regard to phase or the amplifier can not be put into an oscillator condition. If this condition is not satisfied by resistor 13 alone, an R-C network or an R-C filter may be utilized in place of resistor 13 to supply the correct phase relationship.

Another possibility for a circuit to self excite the recording amplifier 4 to oscillate consists of a resistor or an R-C network, or an R-C filter connected between the loudspeaker 2 and a connecting point of the recording amplifier 4. The connecting point of the recording amplifier is chosen so that the amplifier is brought to oscillate when the tape end contacts 11 and 12 are bridged by the foil coated end of the tape.

Thus, in accordance with the above, the aforementioned objects are attained.

Having thus described the invention, what is claimed is:

1. In a magnetic tape recorder having a microphone, recording amplifier and loudspeaker, an audible tape end signal generating circuit for use with a magnetic tape having a foil coating at the end thereof, the improvement comprising: a pair of contacts adapted to be bridged by said foil coating, said contacts when bridged completing a first loop connecting the loudspeaker directly to the output of said amplifier and simultaneously completing a second loop connecting the output of said amplifier to the microphone output, neither of the loops defining an acoustic path for said end of tape signal and said end of tape signal is generated by said amplifier oscillating so that the microphone is not an essential constituent of said audible end of tape signal generating circuit.

2. The invention in accordance with claim 1 further comprising a circuit element interposed between said microphone and said loudspeaker and interposed between said microphone and said amplifier imput when said contacts are bridged by said foil, said circuit element comprising a resistor, an R-C network or an R-C filter as determined by the amplifier.

* * * * *